United States Patent [19]

Monnin

[11] Patent Number: 4,758,729

[45] Date of Patent: Jul. 19, 1988

[54] APPARATUS AND METHOD FOR MEASURING THE INCLUDED ANGLE OF A REFLECTIVE CONE

[75] Inventor: Douglas B. Monnin, Huber Heights, Ohio

[73] Assignee: Spectra-Physics, Inc., San Jose, Calif.

[21] Appl. No.: 90,944

[22] Filed: Aug. 28, 1987

[51] Int. Cl.$^4$ ............................................. G01N 21/86
[52] U.S. Cl. ..................................... 250/560; 356/391
[58] Field of Search ................ 250/560, 561; 356/376, 356/388, 391–393

[56] References Cited

U.S. PATENT DOCUMENTS 3,419,329 12/1968 Vogeley et al. ..................... 356/391
3,527,953 9/1970 Chitayat .............................. 250/561

*Primary Examiner*—David C. Nelms
*Assistant Examiner*—Stephone B. Allen
*Attorney, Agent, or Firm*—Killworth, Gottman, Hagan & Schaeff

[57] ABSTRACT

An apparatus and method are provided for measuring the included angle of a reflective cone between opposite sides of the reflective cone. The apparatus includes means for illuminating the curved surface of the reflective cone with a collimated beam of light, the beam of light being generally parallel to the axis of the cone. A lens receives directly a portion of the light reflected from a first side of the cone, and focuses the portion of the light so received in a reference plane. A retro-reflective mirror arrangement, positioned on the side of the cone opposite the lens, receives directly a portion of the light reflected from a second side of the cone and redirects the light to the lens in a direction parallel to the light reflected from the second side of the cone. The second side of the cone is opposite to the first side of the cone. A light detection arrangement at the focal point of the lens displays the light received by the lens, whereby the spacing between the light received from the retro-reflective mirror arrangement and the light received directly from the cone is related to the included angle between the first and second sides of the reflective cone.

20 Claims, 1 Drawing Sheet

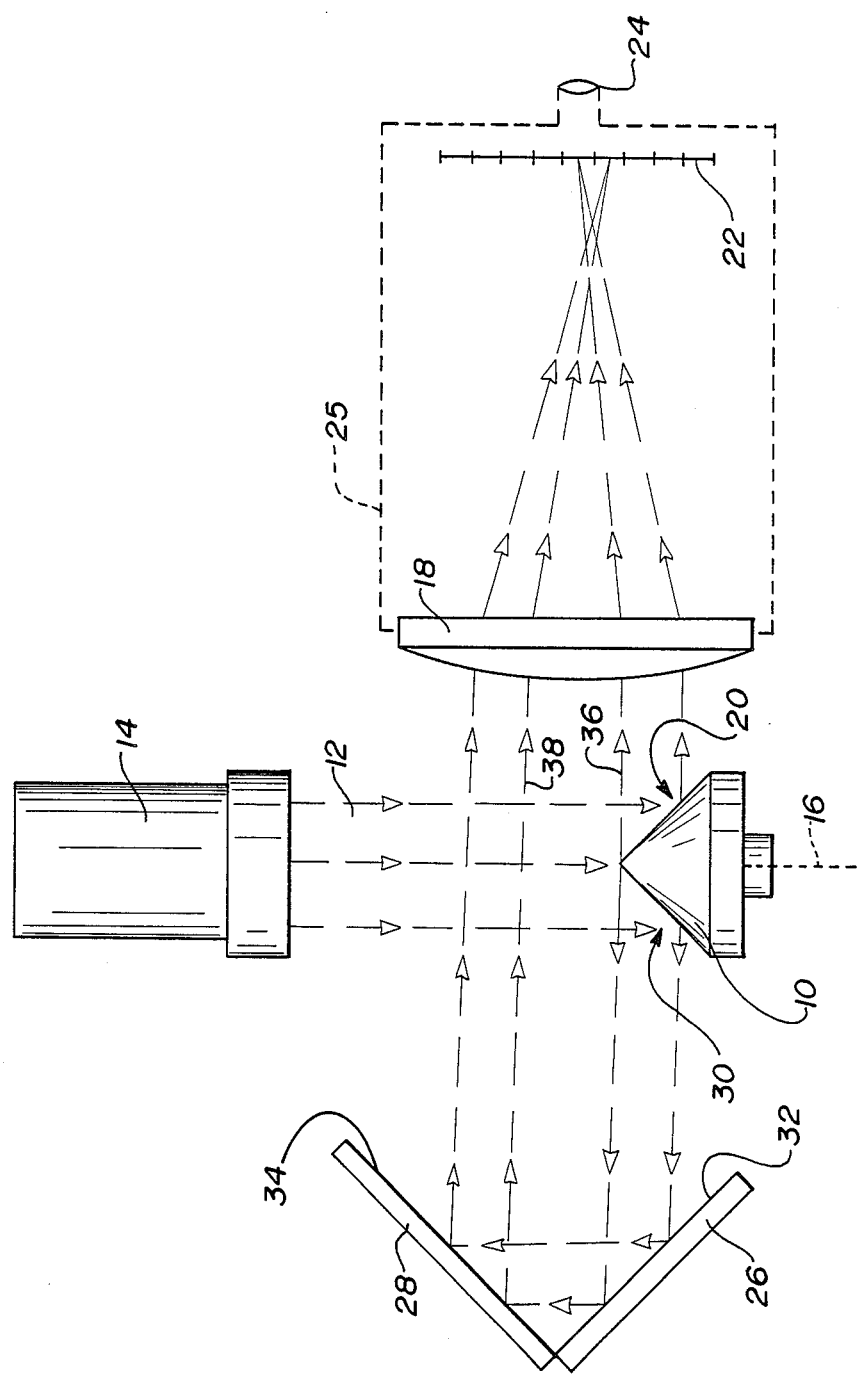

APPARATUS AND METHOD FOR MEASURING THE INCLUDED ANGLE OF A REFLECTIVE CONE

BACKGROUND OF THE INVENTION

The present invention relates to an apparatus and method for checking a reflective cone and, more particularly, to such an apparatus and method in which the included angle between opposite sides of the curved surface of the reflective cone are measured.

Reflectors in a conical shape have utility in various optical systems. Such a reflector has a reflective, curved surface which may be used to reflect a beam of light. When the beam is generally aligned with the axis of the cone and directed so as to strike the cone at its apex and on the curved surface surrounding the apex, the beam is reflected radially outward from the axis of the cone. If the included angle between opposite sides of the cone is ninety degrees, the beam is reflected radially outward in a plane. For example, a laser beam may thus be reflected into a plane which provides a continuous reference level over a construction site.

A laser beam transmitted which utilizes a similar conical reflector is shown in U.S. Pat. No. 4,679,937, issued July 14, 1987, to Cain et al, and assigned to the assignee of the present invention. The Cain et al transmitter provides a conical reflector having an included angle which is slightly less than ninety degrees. The laser light beam travels upward, striking the reflector and being reflected into a slightly upwardly directed conical shape. This is more than compensated by refraction of a surrounding glass housing, however, so as to produce a cone of laser light which is directed slightly downward. The purpose of this slight downward tilt to the reference cone of light is to compensate in part for the curvature of the earth over relatively large construction sites.

A principle problem which exists in the production of conical reflectors, regardless of the angle of the apex of such reflectors, is the difficulty in testing the reflectors for conformity to design specifications. This difficulty is due to the curved shape of the surface being measured and to the narrow tolerances to which reflectors must be constructed for some applications. It will be appreciated that if the transmitter using the reflector has an operating range of 1000 feet, even a very small deviation in the angular orientation of the reflective surface produces an appreciable and unacceptable error in the position of the reference light plane at the more remote points of the construction site. While some test fixtures have been developed in the past for testing conical reflectors, such test fixtures have been difficult to set up and time consuming to use.

It is seen that there is a need, therefore, for an apparatus and method for measuring the included angle of a reflective cone between opposite sides of the cone, in which the measurement process can be effected quickly and accurately.

SUMMARY OF THE INVENTION

This need is meet by an apparatus and method according to the present invention for measuring the included angle of a reflective cone between opposite sides of the reflective cone. The apparatus includes means for illuminating the curved surface of the reflective cone with a collimated beam of light, the beam of light being generally parallel to the axis of the cone. A lens means receives directly a portion of the light reflected from a first side of the cone, and focuses the portion of the light so received in a reference plane. A retro-reflective means, positioned on the side of the cone opposite the lens means, receives directly a portion of the light reflected from a second side of the cone and redirects the light to the lens means in a direction parallel to the light reflected from the second side of the cone. The second side of the cone is opposite to the first side of the cone. A light detection means at the focal point of the lens means displays the light received by the lens means, whereby the spacing between the light received from the retro-reflective means and the light received directly from the cone is related to the included angle between the first and second sides of the reflective cone.

The retro-reflective means may comprise a pair of mirrors having their mirrored surfaces oriented at a 90 degree included angle. The light detection means may comprise a screen. The pair of mirrors in the retro-reflective means may be oriented so as to reflect light received from the cone to the lens means along a path which is parallel to the path of the light received from the second side of the cone, but offset with respect thereto, such that the light reflected from the retro-reflective means to the lens means does not strike the cone.

The light detection means at the focal point of the lens means for displaying the light received by the lens means may comprise a reticle screen in the plane. An eyepiece may be provided for viewing the reticle screen. The means for illuminating the curved surface of the reflective cone with a collimated beam of light may comprise a source of laser light. The included angle is equal to ninety degrees minus one half the angle of divergence between the light reflected by the first side of the cone and the light reflected from the retro-reflective means.

The spacing in the reference plane between the light received from the retro-reflective means and the light received directly from the cone is equal to the angle of divergence multiplied by the focal length of the lens means. The lens means and the light detection means comprise portions of an auto-collimator.

A method for measuring the included angle of a reflective cone between opposite, first and second sides of a reflective cone, comprise the steps of:

a. illuminating the curved surface of the reflective cone with a collimated beam of light, the beam of light being generally parallel to the axis of the cone;

b. receiving a portion of the light reflected from the second side of the cone and redirectng the light in a direction parallel to the light reflected from the second side of the cone;

c. positioning a lens so as to focus in a reference plane a portion of the light reflected from a first side of the cone, and a portion of the redirected light from the second side of the cone; and d. displaying in the reference plane the light received by the lens, whereby the spacing between the light received from the first and second sides of the cone is related to the included angle.

The step of receiving and redirecting a portion of the light reflected from the second side of the cone is accomplished by means of a pair of mirrors having their mirrored surfaces oriented at a 90 degree included angle. The step of displaying includes the step of displaying the light on a screen. The pair of mirrors are oriented so as to reflect light received from the cone to the lens along a path which is parallel to the path of the light received from the second side of the cone, but offset with respect thereto, such that the light reflected from the mirrors to the lens does not strike the cone. A reticle screen is positioned in the plane, and an eyepiece is provided for viewing the reticle screen.

The collimated beam of light may comprise a beam of laser light. The included angle may be equal to ninety degrees minus one half the angle of divergence between the light reflected by the first side of the cone and the light reflected from the second side of the cone and subsequently redirected. The spacing in the reference plane between the light received from the first and second sides of the cone is equal to the angle of divergence multiplied by the focal length of the lens. The lens may form a portion of an auto-collimator.

Accordingly, it is an object of the present invention to provide an improved apparatus and method for measuring the included angle between two sides of a reflective cone; to provide such an apparatus and method in which the measurement process is relatively insensitive to errors in the orientation of the reflective cone with respect to the direction of the illuminating collimated light beam; to provide such an apparatus and method in which the measurement process is relatively insensitive to mechanical instability of the measurement apparatus; and to provide such an apparatus and method in which a reflective cone may be check easily, simply and quickly for a desired uniform, curved, reflective surface.

Other objects and advantages of the invention will be apparent from the following description, the accompanying drawing and the appended claims.

BRIEF DESCRIPTION OF THE DRAWING

The FIGURE is a side, schematic view illustrating the apparatus and method according to the present invention by which the included angle of a reflective cone between opposite sides of the cone may be measured.

DETAILED DESCRIPTION OF THE PREFERRED EMBODIMENT

Reference is made to the figure which illustrates apparatus constructed according to the present invention for measuring the included angle of a reflective cone 10 between opposite sides of the cone. A means for illuminating the curved surface of the reflective cone with a collimated beam of light 12, preferably a beam of laser light, includes a laser source 14. The beam of light 12 is generally parallel to the axis of said cone, indicated by dashed line 16. A lens means, including lens 18, receives directly a portion of the light reflected from a first side of conical sector 20 of the cone 10, and focuses the portion of the light received in a reference plane in which is positioned reticle screen 22. An eyepiece 24 is provided for viewing the reticle screen. The lens 18, reticle screen 22 and eyepiece 24 may advantageously form a part of a measuring telescope or an auto-collimator 25. It will be appreciated that the rays of light intercepted by the lens 18 diverge in a direction normal to the plane of the figure. As a consequence, the rays will be focused as a line across the reticle screen 22 which also extends generally normal to the plane of the figure.

A retro-reflective means, including a pair of mirrors 26 and 28, is positioned on the side of the cone opposite the lens 18, for receiving directly a portion of the light reflected from a second side or conical sector 30 of the cone and redirecting the light to the lens 18. The second side 30 of the cone 10 is directly opposite the first side 20 of the cone. The pair of mirrors 26 and 28 is oriented so as to reflect light received from the cone 10 to the lens 18 along a path which is generally parallel to the path of the light received from the second side 30 of the cone, but offset with respect thereto, such that the light reflected from the retro-reflective means to the lens does not strike the cone.

The light rays traveling from the mirror 28 to the lens 18 have directional components in the plane of the figure which are parallel to the directional components in the plane of the figure of these rays as they travel from side 30 of cone 10 to mirror 26. The mirrors 26 and 28 have their mirrored surfaces 32 and 34, respectively, oriented at a ninety degree included angle so as to provide retro-reflection.

It will be appreciated that the mirror 26 intercepts diverging rays which are reflected from the curved reflective surface of the cone 10. The divergence of the rays in a direction normal to the plane of the figure continues as the rays are relfected by the mirrors 26 and 28 and travel to the lens 18. The mirrors provide retro-reflection of the rays of light in the plane of the figure, a plane which is normal to the reflective surfaces 32 and 34. Like the rays of light intercepted by the lens 18 from side 20, the rays of light received by lens 18 from mirror 28 diverge in a direction normal to the plane of the figure. As a consequence, these rays will also be focused as a line across the reticle screen 22 which extends generally normal to the plane of the figure.

The reticle screen 22 provides a light detection means at the focal point of the lens 18 for displaying the light received by the lens. It has been found that the spacing between the light received from the retro-reflective mirrors 26 and 28 and the light received directly from the side 20 of cone 10 is related to the included angle between the first and second sides 20 and 30 of the reflective cone 10. The included angle is equal to ninety degrees minus one half the angle of divergence between the light reflected by the first side of the cone and the light reflected from the retro-reflective means. Thus, if the rays 26 and 38 diverge in the plane of the figure by 1 degree, the included angle is measured as 89.5 degrees. Similarly, if rays 26 and 28 converge in the plane of the figure by 1 degree, the included angle is measured as 90.5 degrees.

The spacing in the reference plane defined by the reticle screen 22 between the light received from the retro-reflective mirrors 26 and 28 and the light received directly from the cone 10 is equal to the angle of divergence or convergence multiplied by the focal length of the lens 18. As a consequence, by merely observing the screen 22 through the eyepiece 24, a measurement may be made which permits ready calculation of the included angle of the cone. If there is a question as to whether the rays 36 or 38 are converging or diverging, one may simply block off one of the two light paths momentarily so as to identify the source of the lines of light which are focused on the screen 22.

It will be appreciated that if retro-reflective mirrors 26 and 38 are oriented at other than a 90° angle, the light rays traveling from mirror 28 to the lens 18 will have directional components in the plane of the figure which are not precisely parallel to the directional components in the plane of the figure of these rays as they travel from side 30 of cone 10 to mirror 26. This is acceptable, provided an appropriate correction is made in the angle measured by means of lens 18 and reticle 22.

It has been found that the apparatus and method of the present invention provide a simple and reliable way of measuring the included angle of a reflective cone. This approach is relatively insensitive to alignment of the cone with respect to the test apparatus. If the cone is tipped slightly out of its desired orientation, the result is a slight movement of the lines of light on reticle screen 22. Since both lines move together with the distance between them remaining constant, however, the measurement process is unaffected. It will be appreciated that the cone 10 may be rotated about its axis 16 and additional measurements made. This may be facilitated, if desired, by providing a rotary support for the cone.

Having described the invention in detail and by reference to the preferred embodiment thereof, it will be apparent that modifications and variations are possible without departing from the scope of the invention defined in the appended claims.

What is claimed is:

1. Apparatus for measuring the included angle of a reflective cone between opposite sides of said reflective cone, comprising:
    means for illuminating the curved surface of said reflective cone with a collimated beam of light, said beam of light being generally parallel to the axis of said cone,
    lens means for receiving directly a portion of the light reflected from a first side of said cone, and for focusing the portion of the light so received in a reference plane,
    retro-reflective means, positioned on the side of said cone opposite said lens means, for receiving directly a portion of the light reflected from a second side of said cone and redirecting said light to said lens means substantially parallel to the light reflected from said second side of said cone, said second side of said cone being opposite to said first side of said cone, and
    light detection means at the focal point of said lens means for displaying the light received by said lens means, whereby the spacing between the light received from said retro-reflective means and the light received directly from said cone is related to said included angle between said first and second sides of said reflective cone.

2. The apparatus of claim 1 for measuring the included angle of a reflective cone between opposite sides of said reflective cone in which said light detection means comprises a screen.

3. The apparatus of claim 1 for measuring the included angle of a reflective cone between opposite sides of said reflective cone in which said means for illuminating the curved surface of said reflective cone with a collimated beam of light comprises a source of laser light.

4. The appratus of claim 1 for measuring the included angle of a reflective cone between opposite sides of said reflective cone in which said lens means and said light detection means comprise portions of an auto-collimator.

5. The apparatus of claim 1 for measuring the included angle of a reflective cone between opposite sides of said reflective cone in which said retro-reflective means comprises a pair of mirrors having their mirrored surfaces oriented at a 90 degree included angle.

6. The apparatus of claim 1 for measuring the included angle of a reflective cone between opposite sides of said reflective cone in which said light detection means at the focal point of said lens means for displaying the light received by said lens means comprises a reticle screen in said plane.

7. The appratus of claim 1 for measuring the included angle of a reflective cone between opposite sides of said reflective cone in which the included angle is equal to ninety degrees minus one half the angle of divergence between the light reflected by the first side of the cone and the light reflected from the retro-reflective means.

8. The appratus of claim 5 for measuring the included angle of a reflective cone between opposite sides of said reflective cone in which said pair of mirrors in said retro-reflective means are oriented so as to reflect light received from said cone to said lens means along a path which is parallel to the path of the light received from the second side of the cone, but offset with respect thereto, such that the light reflected from said retro-reflective means to said lens means does not strike said cone.

9. The apparatus of claim 6 for measuring the included angle of a reflective cone between opposite sides of said reflective cone further comprises an eyepiece for viewing said reticle screen.

10. The apparatus of claim 7 for measuring the included angle of a reflective cone between opposite sides of said reflective cone in which said spacing in said reference plane between the light received from said retro-reflective means and the light received directly from said cone is equal to said angle of divergence multiplied by the focal length of said lens means.

11. A method for measuring the included angle of a reflective cone between opposite, first and second sides of said reflective cone, comprising the steps of:
    illuminating the curved surface of said reflective cone with a collimated beam of light, said beam of light being generally parallel to the axis of said cone,
    receiving a portion of the light reflected from said second side of said cone and redirecting said light in a direction generally parallel to the light reflected from said second side of said cone,
    positioning a lens so as to focus in a reference plane a portion of the light reflected from a first side of said cone, and a portion of the redirected light from the second side of said cone, and
    displaying in the reference plane the light received by said lens, whereby the spacing between the light received from said first and second sides of said cone is related to said included angle.

12. The method of claim 11 for measuring the included angle of a reflective cone between opposite sides of said reflective cone in which said step of displaying includes the step of displaying the light on a screen.

13. The method of claim 11 for measuring the included angle of a reflective cone between opposite sides of said reflective cone in which said collimated beam of light comprises a beam of laser light.

14. The method of claim 11 for measuring the included angle of a reflective cone between opposite sides of said reflective cone in which said lens forms a portion of an auto-collimator.

15. The method of claim 11 for measuring the included angle of a reflective cone between opposite sides of said reflective cone in which the step of receiving and redirecting a portion of the light reflected from said second side of the cone is accomplished by means of a pair of mirrors having their mirrored surfaces oriented at a 90 degree included angle.

16. The method of claim 11 for measuring the included angle of a reflective cone between opposite sides of said reflective cone in which a reticle screen is positioned in said plane.

17. The method of claim 11 for measuring the included angle of a reflective cone between opposite sides of said reflective cone in which the included angle is equal to ninety degrees minus one half the angle of divergence between the light reflected by the first side of the cone and the light reflected from the second side of the cone and subsequently redirected.

18. The method of claim 15 for measuring the included angle of a reflective cone between opposite sides of said reflective cone in which said pair of mirrors are oriented so as to reflect light received from said cone to said lens along a path which is parallel to the path of the light received from the second side of the cone, but offset with respect thereto, such that the light reflected from said mirrors to said lens does not strike said cone.

19. The method of claim 16 for measuring the included angle of a reflective cone between opposite sides of said reflective cone in which an eyepiece is provided for viewing said reticle screen.

20. The method of claim 17 for measuring the included angle of a reflective cone between opposite sides of said reflective cone in which said spacing in said reference plane between the light received from said first and second sides of said cone is equal to said angle of divergence multiplied by the focal length of said lens.

* * * * *